US011753109B2

United States Patent
Pasqua et al.

(10) Patent No.: US 11,753,109 B2
(45) Date of Patent: Sep. 12, 2023

(54) BICYCLE ELECTRIC/ELECTRONIC DERAILLEUR OF THE ARTICULATED PARALLELOGRAM TYPE

(71) Applicant: CAMPAGNOLO S.R.L., Vicenza (IT)

(72) Inventors: Paolo Pasqua, Camisano Vicentino (IT); Luca De Poli, Galliera Veneta (IT)

(73) Assignee: CAMPAGNOLO S.R.L, Vicenza (IT)

( * ) Notice: Subject to any disclaimer, the term of this patent is extended or adjusted under 35 U.S.C. 154(b) by 0 days.

(21) Appl. No.: 17/954,009

(22) Filed: Sep. 27, 2022

(65) Prior Publication Data

US 2023/0099532 A1 Mar. 30, 2023

(30) Foreign Application Priority Data

Sep. 28, 2021 (IT) .......................... 102021000024737

(51) Int. Cl.
*B62M 9/122* (2010.01)
*B62M 9/1242* (2010.01)
*B62M 9/1246* (2010.01)

(52) U.S. Cl.
CPC .......... *B62M 9/122* (2013.01); *B62M 9/1242* (2013.01); *B62M 9/1246* (2013.01)

(58) Field of Classification Search
CPC ...... B62M 9/1242; B62M 2009/12406; B62M 9/121; B62M 9/122
USPC ...................................................... 474/80, 82
See application file for complete search history.

(56) References Cited

U.S. PATENT DOCUMENTS

| 6,203,459 B1 * | 3/2001 | Calendrille, Jr. .... | B62M 9/1242 474/82 |
| 2007/0021247 A1 * | 1/2007 | Bohm .................. | B62M 9/1242 474/82 |
| 2014/0087901 A1 * | 3/2014 | Shipman .............. | B62M 9/1242 429/100 |
| 2017/0320541 A1 * | 11/2017 | Pasqua ................. | B62M 9/1342 |
| 2018/0001960 A1 * | 1/2018 | Pasqua .................. | B62M 25/08 |
| 2019/0144071 A1 * | 5/2019 | Boehm .................. | B62M 9/122 474/80 |
| 2019/0300111 A1 * | 10/2019 | Liao ..................... | B62M 9/1242 |
| 2019/0300112 A1 * | 10/2019 | Liao ...................... | B62M 9/122 |

(Continued)

FOREIGN PATENT DOCUMENTS

EP 3266694 A1 1/2018

OTHER PUBLICATIONS

Search Report for Italian Application No. 102021000024737 dated Jun. 10, 2022.

*Primary Examiner* — Henry Y Liu
(74) *Attorney, Agent, or Firm* — Steinfl + Bruno, LLP

(57) ABSTRACT

A bicycle electric/electronic derailleur has a plurality of mutually movable components: a support body configured to be attached to a bicycle frame, a chain guide, and a pair of connecting arms, for connection between the support body and the chain guide at respective geometric articulation axes. A geared motor controls the motion of the plurality of mutually movable components. At least one first component has a case with a chamber containing the geared motor and/or one or more electric/electronic devices. The chamber crosses at least one articulation axis. The case comprises a blind hole that is coaxial with the one axis and open outwards of the case. A second component has a pivot pivotable in the blind hole.

12 Claims, 5 Drawing Sheets

(56) References Cited

U.S. PATENT DOCUMENTS

| | | | | |
|---|---|---|---|---|
| 2019/0315435 A1* | 10/2019 | Jordan | .................... | B62M 6/50 |
| 2020/0166089 A1* | 5/2020 | Choltco-Devlin | ...... | F16D 41/16 |
| 2020/0223513 A1* | 7/2020 | Ho | ........................ | B62M 9/122 |
| 2020/0231249 A1* | 7/2020 | Ho | ........................ | B62K 23/06 |
| 2020/0255089 A1* | 8/2020 | Shipman | ................ | B62M 9/132 |
| 2020/0339220 A1* | 10/2020 | Boehm | ................ | B62M 9/1242 |
| 2020/0346714 A1* | 11/2020 | Hahn | .................... | B62J 45/414 |
| 2020/0361565 A1* | 11/2020 | Komatsu | ................ | B62M 9/126 |
| 2021/0129937 A1* | 5/2021 | Sala | ........................ | H02J 7/02 |
| 2021/0129938 A1* | 5/2021 | Sala | .................... | B62M 9/1242 |
| 2021/0129939 A1* | 5/2021 | Sala | ...................... | B62M 9/122 |
| 2021/0387696 A1* | 12/2021 | Sala | ...................... | B62M 9/122 |
| 2022/0081065 A1* | 3/2022 | Yamamoto | ............... | B62J 45/00 |
| 2022/0355899 A1* | 11/2022 | Shipman | ................ | B62M 9/122 |
| 2022/0411017 A1* | 12/2022 | Braedt | .................... | B62M 9/16 |

\* cited by examiner

BICYCLE ELECTRIC/ELECTRONIC DERAILLEUR OF THE ARTICULATED PARALLELOGRAM TYPE

CROSS REFERENCE TO RELATED APPLICATIONS

This application claims the benefit of Italian Patent Application No. 102021000024737, filed on Sep. 28, 2021, which is incorporated herein by reference as if fully set forth.

FIELD OF INVENTION

The present invention relates to a bicycle electric/electronic derailleur of the articulated parallelogram type.

BACKGROUND

A motion transmission system in a bicycle typically comprises a closed-loop chain extending between toothed wheels associated with the bottom bracket spindle and with the hub of the rear wheel, respectively. When at t least one of the bottom bracket spindle and the hub of the rear wheel there is a group of two or more coaxial toothed wheels, respectively also called chain rings and sprockets, and the motion transmission system is thus provided with a gearshift, a front derailleur and/or a rear derailleur is/are provided for bringing the transmission chain into engagement with a preselected toothed wheel, thus changing the gear ratio.

EP 3 266 694 A1 and corresponding US 2018/0001960 A1 disclose a bicycle electric derailleur comprising a support body that is configured to be attached to a frame of the bicycle, a chain guide connected to the support body through a linkage, an electric motor that drives the linkage to displace the chain guide among toothed wheels of a motion transmission system, wherein the linkage includes two connecting rods, the opposite ends of each of which are articulated to the support body and to the chain guide, to form an articulated parallelogram, wherein an output shaft of the electric motor or of the motor gear coincides with an articulation pivot of the articulated parallelogram linkage, wherein a pivot extending from one of the connecting rods engages in a hole formed at one end of the output shaft, and a second end of the output shaft of the electric motor or of the motor gear engages in a hole formed in said one of the connecting arms. The geared motor is supported by a framework that has two holes at the two ends of the output shaft of the motor gear, which framework is housed within an inner chamber defined by casing portions suitably constrained to each other, for example by thermowelding, ultrasound welding, sealing, gluing, etcetera.

The configuration of that document requires a geared motor having an output shaft extended along the entire length necessary to define the articulation pivot, and that is hollow at the first end, what entails size and weight of the geared motor that may not be desirable in certain derailleurs—in particular, but not limited to, in the field of racing bicycles. Furthermore, as visible in FIG. 5 of that document, the casing has a wide opening extending from one end of the output shaft of the geared motor to the other one in order to allow the rotation of one of the connecting arms, what allows entry of dirt, water and other liquids in the inner chamber, which may impair electric/electronic devices housed in the casing.

The technical problem at the basis of the invention is to provide an electric/electronic derailleur of the articulated parallelogram type provided with at least one chamber that is or may be adequately and conveniently hermetically closed, so as to be well suited to contain one or more electric/electronic devices in the conditions of dirt and humidity to which the derailleur is subject. A secondary aim is to allow the derailleur to have contained weight and dimensions.

SUMMARY

The disclosed bicycle electric/electronic derailleur comprises a plurality of mutually movable components including a support body configured to be attached to a bicycle frame, a chain guide, and a pair of connecting arms comprising a proximal connecting arm and a distal connecting arm, for connection between the support body and the chain guide, at respective geometric articulation axes, comprising a support body-proximal connecting arm articulation axis, a support body-distal connecting arm articulation axis, a chain guide-proximal connecting arm articulation axis, and a chain guide-distal connecting arm articulation axis. A geared motor controls the mutual motion of the plurality of mutually movable components. At least one first component of the mutually movable components includes a case, wherein a chamber is formed to contain the geared motor and/or one or more electric/electronic devices. The chamber crosses at least one of the two articulation axes to which the first component is articulated. The case has a blind hole that opens outward and is coaxial with the crossed axis. A second component of the mutually movable components is articulated to the first component at the crossed axis through a pivot pivotable in the first blind hole.

BRIEF DESCRIPTION OF THE DRAWINGS

Further features and advantages of the present invention will become clearer from the following detailed description of some preferred embodiments thereof, made with reference to the attached drawings, wherein.

DETAILED DESCRIPTION OF EMBODIMENTS

Figure 1:
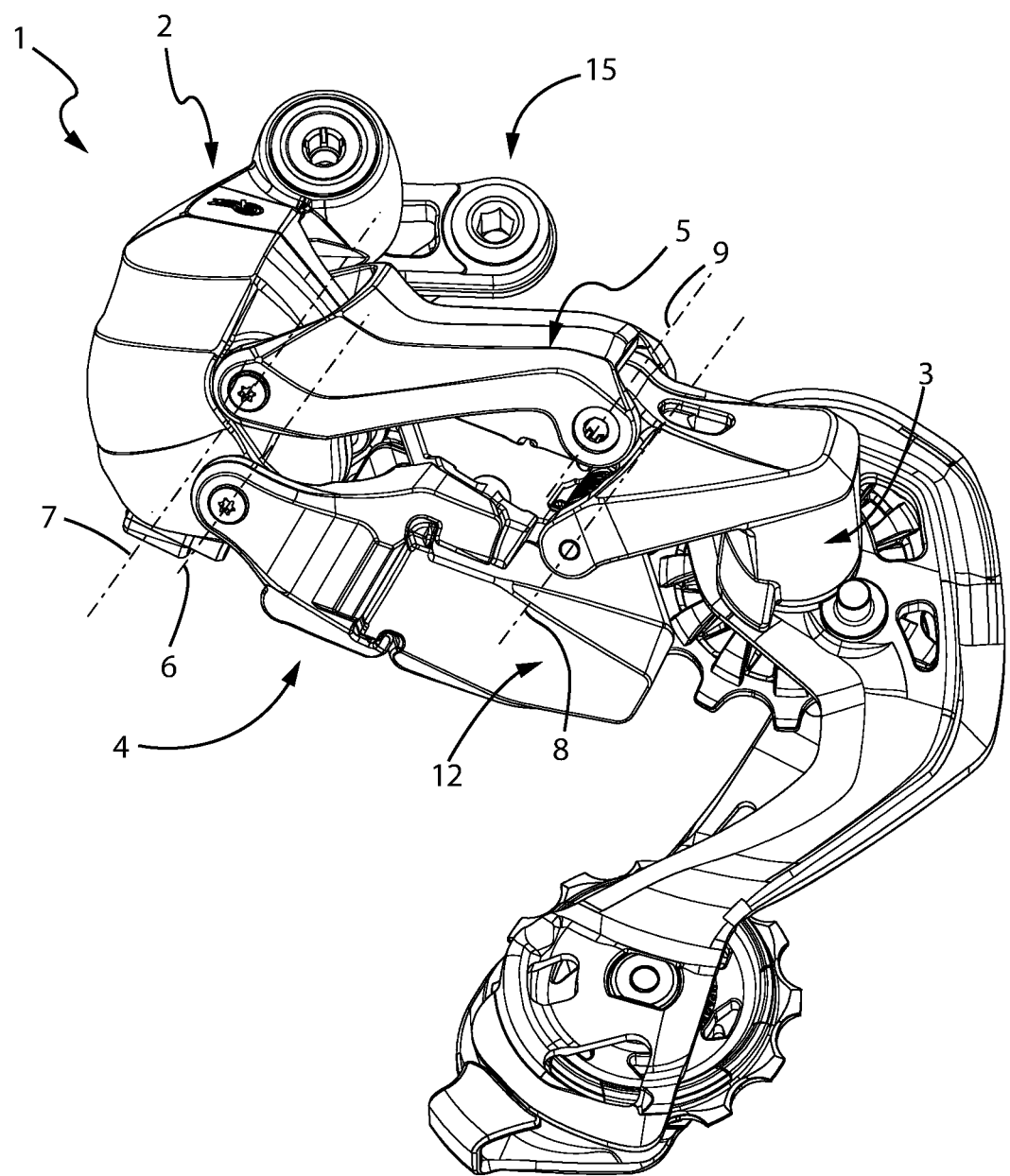
FIG. 1 is a perspective view of a bicycle derailleur of the articulated parallelogram type.

In the present disclosure, expression "electric/electronic" is used to indicate an electric device that may also include electronic components and/or a data processing system.

In some cases, the chain is replaced by a toothed belt, but for the sake of brevity hereinafter in the present disclosure, term "chain" will be used to refer to both cases of motion transmission member between the two toothed wheels, in particular in the expression "chain guide".

In the present disclosure, term "chain guide" is used to indicate the component which, overall, is moved with respect to the support body and to the connecting arms; in the case of a rear derailleur it may include a first member articulated in the articulated parallelogram, sometimes called "bottom body", and a second member movable therewith, sometimes called "rocker arm", while in the case of a front derailleur it typically comprises a single member, sometimes called "cage".

A bicycle derailleur of the articulated parallelogram type comprises a plurality of mutually movable components, comprising a support body configured to be attached to a bicycle frame, a chain guide, and a pair of connecting arms for connection between the support body and the chain guide at respective articulation axes.

While in the case of a mechanical gearshift, the derailleurs are controlled exclusively by the cyclist through one or more manual control devices, for example mounted on the handlebars, and the mutual motion of the components in order to change the parallelogram angles is forced for example through a sheathed inextensible cable (also known as Bowden cable), in the case of an electric/electronic gearshift, a geared motor is provided for mutually moving said components. In the present disclosure, under term "geared motor", a motor not coupled with any speed reducer is meant to be encompassed.

The output shaft of the geared motor may extend along an articulation axis in order to directly control the angular position of one of the mutually movable components, for example of one of the connecting arms, or it may extend along the diagonal of the parallelogram.

For controlling the geared motor, electric/electronic signals issued by the manual control devices and/or processed by a data processing system, on the basis of detected quantities relating to the status of the cyclist and/or of the bicycle (derailleurs included) and/or of the route, are used, so that the gearshift may generally operate in manual mode (which on the other hand is the only one available in the case of a mechanical gearshift), in totally automatic mode and/or in semiautomatic mode.

The geared motor, as well as the electric/electronic components among which for example the data processing system, need to be electrically powered, so that it may be desirable to provide, in the derailleur itself, for an electric power supply unit, typically of the secondary cell battery type.

In an aspect, the invention relates to a bicycle electric/electronic derailleur comprising:

a plurality of mutually movable components, comprising a support body configured to be attached to a bicycle frame, a chain guide, and a pair of connecting arms comprising a proximal connecting arm and a distal connecting arm, for connection between the support body and the chain guide at respective geometric articulation axed, comprising a support body-proximal connecting arm articulation axis, a support body-distal connecting arm articulation axis, a chain guide-proximal connecting arm articulation axis, and a chain guide-distal connecting arm articulation axis, a geared motor for controlling the mutual motion of the plurality of mutually movable components, wherein at least one first component of the mutually movable components comprises a case, wherein a chamber containing said geared motor and/or one or more electric/electronic devices is formed in said case, the chamber crossing at least one first axis of the two among said articulation axes to which the first component is articulated, wherein said case comprises a first blind hole coaxial with said crossed first axis and open outwards of said case, and a second component of the mutually movable components articulated to the first component at said crossed first axis comprises a pivot pivotable in the first blind hole.

In the present disclosure, adjectives such as "proximal" and "distal" refer to the mounted condition of the derailleur on the bicycle. In particular, "proximal" is used to indicate closer to the frame and adjective "distal" is used to indicate farther from the frame.

By defining the geometric articulation axis, at least partially, through the coupling of the pivot and the blind hole, in said area no opening in the case is necessary for the passage of the pivot, so that the hermetic sealing of the chamber is at least simplified.

The first blind hole of the case may be provided with a blind bushing.

The blind bushing may be overprinted in the first component.

The pivot may be formed in a member comprising a screwing tool engagement head and a shank extending from the head, a portion of the shank contiguous to the head being provided with an external threading and the remaining portion of the shank being without threading, wherein the portion provided with external threading is screwed into an internally threaded through hole of the second component, the portion without threading protruding from the through hole forming said pivot.

The internally threaded through hole may be made in an insert of the second component.

The insert may be co-moulded in the second component.

Said case may comprise a second blind hole coaxial with said first crossed axis and open outwards on one opposite side of said case with respect to the first blind hole, the second component comprising a second pivot pivotable in the second blind hole.

As far as the second blind hole and/or the second pivot are concerned, the considerations made above with reference to the first blind hole and to the second pivot apply.

Alternatively, when said chamber contains said geared motor and possibly said one or more electric/electronic devices, said case may further comprise a through hole coaxial with said first crossed axis, the through hole being on the opposed side of said case with respect to the first blind hole, an output shaft of the geared motor extending through the through hole and through a hole of the second component, a hermetic seal gasket being provided for between the through hole and the output shaft.

It is noted that when the case of the first component, at the first crossed axis and on the side opposed to the first blind hole, has neither a second blind hole nor a through hole crossed by the output shaft of the geared motor, then the pivotal coupling between the first and the second components may be made there through other means, for example a through hole extended in a case region not crossing the chamber wherein a pivot of the second component is pivotable, or a pivot of the first component pivotable in a hole of the second component.

Alternatively or additionally to any of the various alternatives mentioned above, when the chamber crosses both articulation axes to which the first component is articulated, said case may comprise one or two additional blind hole(s), coaxial with the second crossed axis, a third component of the mutually movable components articulated to the first component at said second crossed axis comprising one or respectively two pivot(s) pivotable in said one or two additional blind hole(s).

As far as the additional blind holes and/or the respective pivots are concerned, the considerations made above with reference to the first blind hole and to the second pivot apply.

It is furthermore noted that what has been described for the first component may be made also in one or more other components, so as to have plural hermetically closed chambers at disposal, with the structural restriction that each of the articulation axes is shared by two components. In practice, each of the second and the third components may have whatever conformation along the articulation axis that it shares with the fourth component, but along the other articulation axes they will in the first place have to feature the member matching that featured by the "first component".

Said one or more electric/electronic devices may comprise an electric power supply unit, preferably of the secondary cell battery type, and/or one or more components controlling the geared motor and/or the electric power supply unit, if present.

The first component may be the support body.

The derailleur is, for example, a rear derailleur.

The derailleur may also include a data processing system, controlling the geared motor and any other electric/electronic components of the derailleur. The data processing system may comprise electric components and/or discrete electronic components and/or a micro-controller, that may also integrate memory means. The data processing system may be borne for example on at least one printed circuit board or PCB. The derailleur may therefore be electronic.

With reference to the drawings, in FIG. 1 a bicycle electric/electronic derailleur 1, of the articulated parallelogram type, is shown.

In the case shown, it is a rear derailleur 1, but this is to be understood as being merely by way of an example, and the derailleur may be a front derailleur.

The derailleur 1 comprises a support body 2 configured to be attached to a bicycle frame, a chain guide 3, and a pair of connecting arms 4, 5 between the support body 2 and the chain guide 3, forming a plurality of mutually movable components. The pair of connecting arms comprises a proximal connecting arm 4 and a distal connecting arm 5. For example, the support body 4 may be attached to the frame through a connection device so-called "articulated joint" 15.

The mutually movable components 2, 3, 4, 5 may for example be made of steel, a light alloy, a techno-polymer, a composite material and similar.

The connecting arms 4, 5 are connected to the support body 2 and to the chain guide 3 at respective geometric articulation axes: a support body-proximal connecting arm articulation axis 6, a support body-distal connecting arm articulation axis 7, a chain guide-proximal connecting arm articulation axis 8, and a chain guide-distal connecting arm articulation axis 9.

Figure 3:
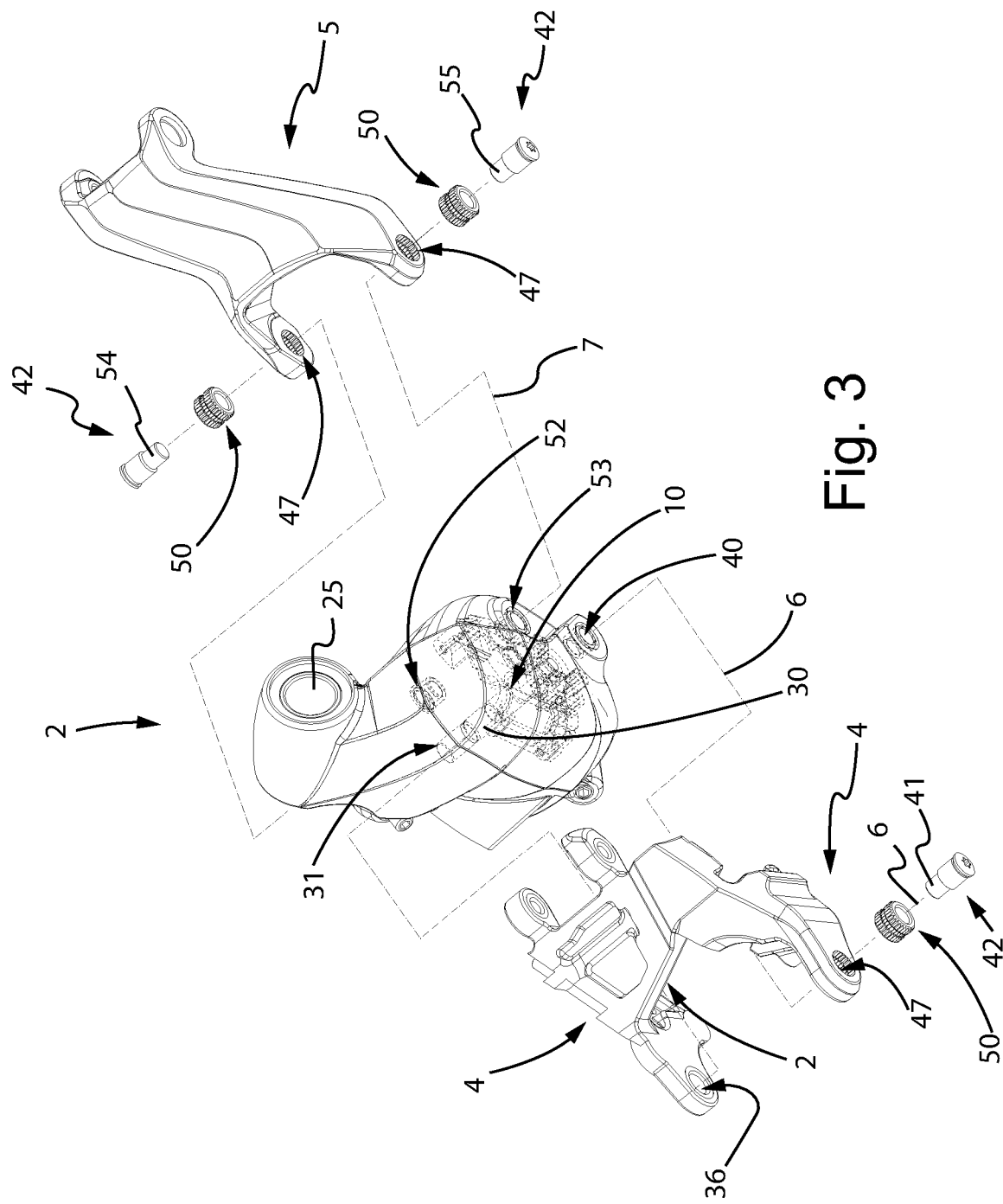
FIG. 3 is a partially exploded view of the components of FIG. 2, according to another perspective.

The electric derailleur 1 comprises a geared motor 10 (FIG. 3, 4). The geared motor 10 may be merely electric or electronic, when the derailleur also includes a data processing system controlling the geared motor 10 and any other electric/electronic components of the derailleur 1, for example comprising one or more components borne by one or more printed circuit boards or PCBs. As mentioned above, the geared motor 10 may also comprise a motor not coupled with any speed reducer.

The geared motor 10 controls the mutual motion of the mutually movable components 2, 3, 4, 5, in particular it determined the aperture and closure of the articulated parallelogram, and therefore a displacement of the chain guide 3—with respect to the support body 2 and therefore to the bicycle frame—having at least one displacement component in the direction of the axis of the group of toothed wheels associated with the hub of the rear wheel or "sprocket assembly", so as to bring the transmission chain (or belt) into engagement with a predetermined toothed wheel or sprocket of the sprocket assembly. In the case of a front derailleur, the displacement of the chain guide 3 has at least one displacement component in the direction of the bottom bracket spindle, so as to bring the transmission chain (or belt) into engagement with a preselected toothed wheel or chainring of the "crankset".

The derailleur 1 further comprises an electric power supply unit 12 comprising one or more secondary cells, for powering the geared motor 10 and any other electric/electronic devices. In the case shown, the electric power supply unit 12 is shown supported by the proximal connecting arm 4, but different locations of the electric power supply unit 12 are possible.

The electric power supply unit 12 may also include at least one printed circuit board or PCB bearing electronic components controlling the electric power supply unit 12. The electric power supply unit 12 may therefore be a so-called smart battery.

The electric power supply unit 12, possibly of the smart battery type, the data processing system for controlling the geared motor 10 and/or other electric/electronic devices represent examples of electric/electronic devices that, just as the geared motor 10, it is advisable to protect against dirt, water and other liquids. For the sake of simplicity, hereinafter reference will be made, in this respect, to the geared motor 10 only.

Figure 2:
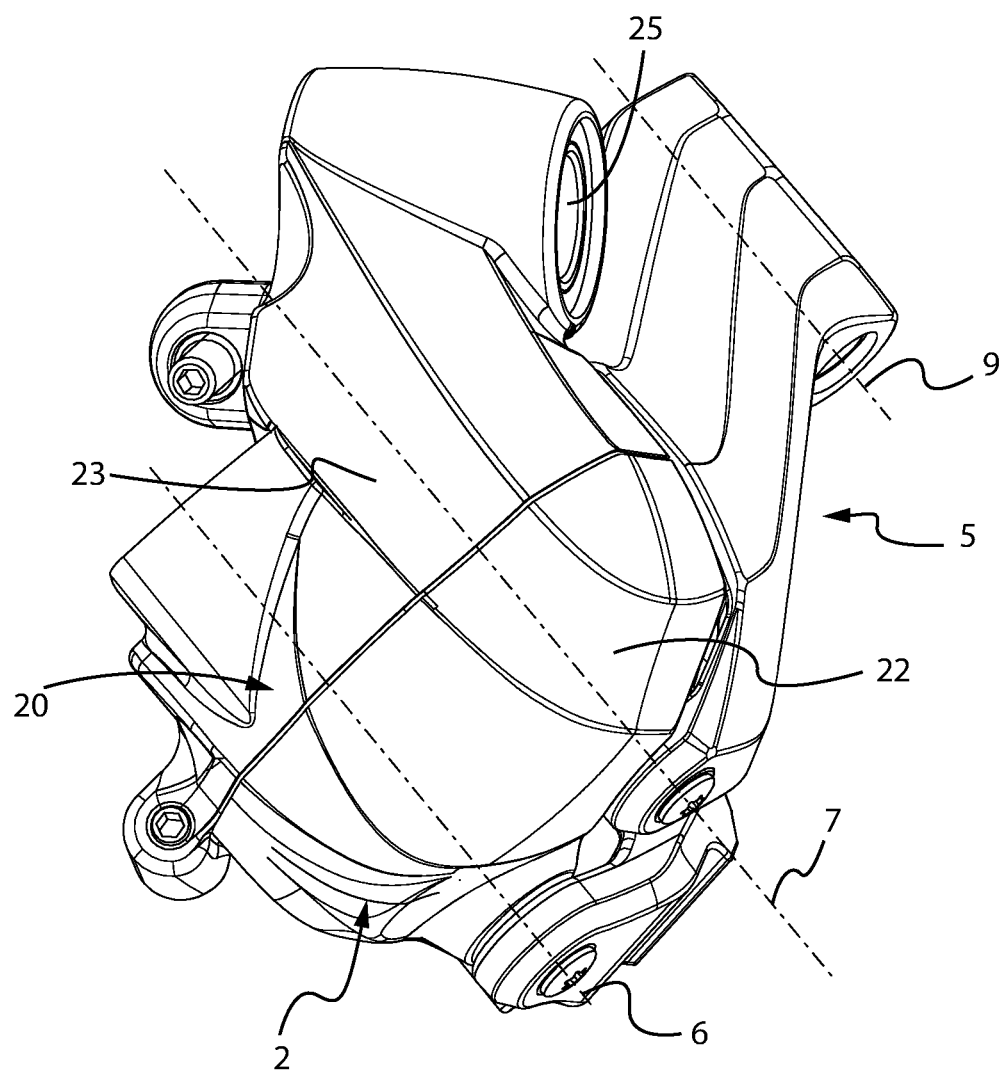
FIG. 2 is a view of some components of the derailleur of FIG. 1, according to another perspective.
Figure 4:
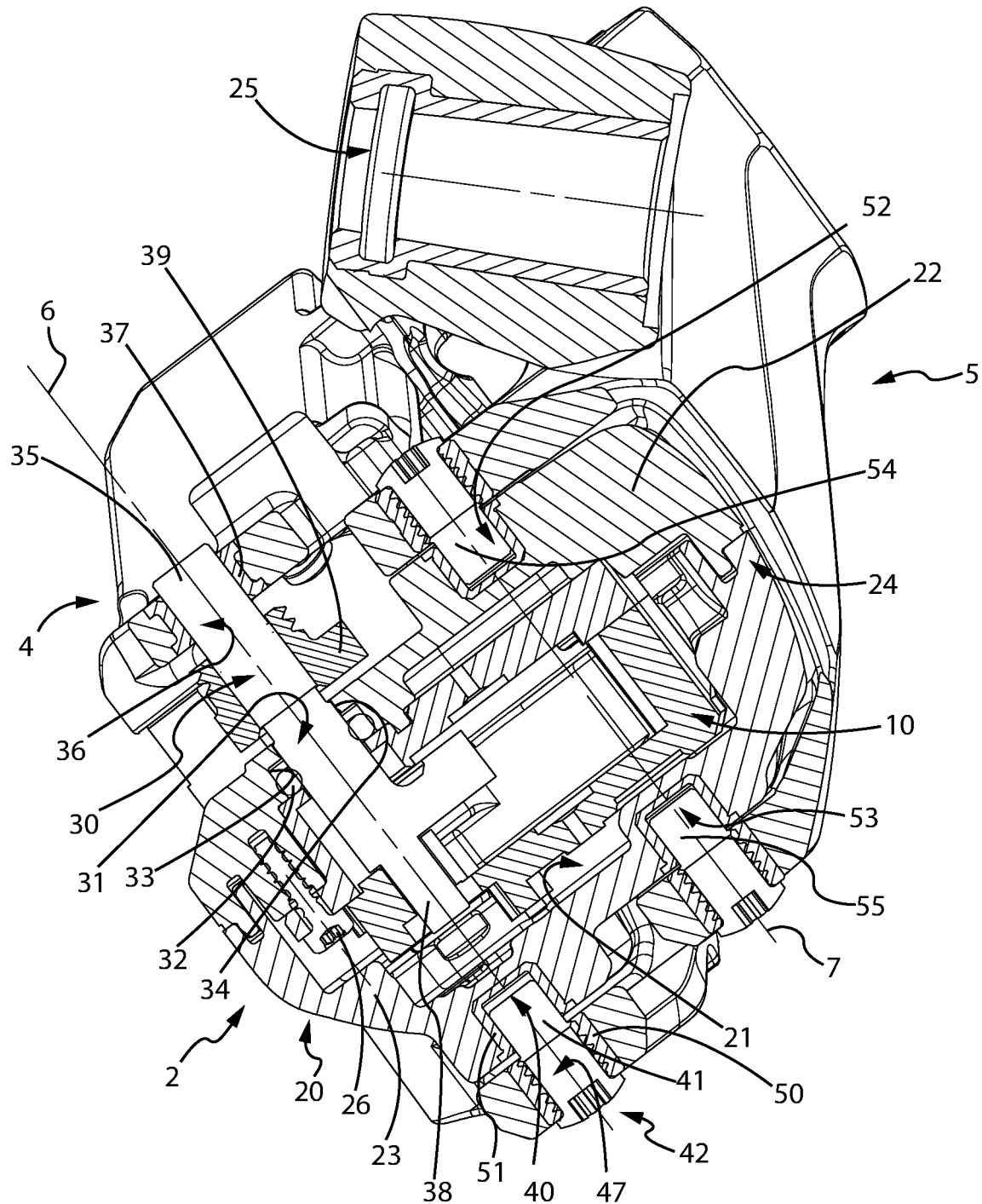
FIG. 4 is a sectional view of the components of FIG. 3, FIGS. 5 and 6 show a member defining a pivot used in the derailleur of FIG. 1, in longitudinal section and in a lateral view.

With reference also to FIGS. 2-4, in the case shown the geared motor 10 is housed in the support body 2, that has to be understood as illustrative of the first component mentioned in the introductory part of the present description. In those figures, for the sake of clarity the chain guide 3 is omitted.

In order to house the geared motor 10, the support body 2 comprises a case 20 wherein a chamber 21 is formed. The case 20 is formed by two portions 22, 23 that, after insertion of the geared motor 10 and whatever else has to be housed in the chamber 21, are fixedly connected to each other, for example through thermowelding, ultrasound welding, sealing, gluing etc.

In the present disclosure, a mechanical connection between two members is said to be "removable" if it allows them to be detached without the aid of tools, "permanent" if it allows them to be detached only with the aid of tools, and "fixed" it the detachment may only take place damaging at least one of the two members.

The connection of the two portions 22, 23 is such as to ensure the hermetic seal and may take place for example forming a sort of labyrinth seal 24 between their coupled edges, filled with resin, for example epoxy resin.

A hole 25 made in the case portion 22 and useful for attaching the support body 2 to the bicycle through the articulated joint 15 may also be recognized.

The geared motor 10 is permanently connected, internally of the chamber 21, for example through screws, of which a screw 26 is visible. In the case shown, the geared motor 10 is fixed to the case portion 22.

In the case shown merely by way of an example, the output shaft 30 of the geared motor 10 is at the support body-proximal connecting arm articulation axis 6. As shown, the chamber 21 thus crosses such articulation axis, that is one of the two axes 6, 7—among said articulation axes 6, 7, 8, 9—to which the support body 2 is articulated. The proximal connecting arm 4 should therefore be understood as illustrative of the second component mentioned in the introductory part of the present description.

The output shaft 30 extends through a through hole 31 of the case 20, in particular made in the case portion 22 to which the geared motor is permanently connected.

A hermetic seal gasket 32 is provided between the through hole 31 and the output shaft 30. For example, the through hole 31 is a counterbored hole and thus it has a first portion 33 contiguous to the chamber 21 having a diameter comparatively larger than a second portion 34 thereof open outwards of the case 20. The hermetic seal gasket 32 is housed in the first portion 33, and is in interference fit with the lateral wall of the same, while the output shaft 30 may rotate dragging on the hermetic seal gasket 32.

The output shaft 30 also extends, at a driving end 35 thereof, through a hole 36 of the proximal connecting arm 4. The output shaft 30 is in interference fit with the hole 36. In the case shown, the hole 36 of the proximal connecting arm 4 is a through hole, but it could also be a blind hole. In the case shown, the hole 36 is provided with a reinforcement insert 37, that for example may be co-moulded with the rest of the proximal connecting arm 4.

The output shaft 30 of the geared motor 10 does not extend through the case 20 at its second end 38 opposed to the driving end 35, and is thus shorter than the conventional configuration wherein the output shaft 30 is connected at both ends thereof with the driven connecting arm. Furthermore, the output shaft 30 of the geared motor 10 does not require any hole at its second end 38. The geared motor 10 is thus more compact and lighter and simpler to be made.

Along the output shaft 30, a drum 39 of a so-called "(gearshift) release device" is also shown, having the function of disengaging the output shaft 30 of the geared motor 10 from the rest of the kinematic chain when the drive torque is excessive, for example in case of seizing of the chain guide 3, or in case of a shock acting from the outside on the connecting arms 6, 7 or on the chain guide 5. The output shaft 30 and the drum 39 are interference fitted through, for example, an external knurl of the coupled portion of the output shaft 30.

The case 20 comprises a blind hole 40 coaxial with the support body—proximal connecting arm articulation axis 6, open outwards of the case 20. The blind hole 40 is on the opposed side of the case 20 with respect to the through hole 31—namely, adjacent to the side of the second end 38 of the output shaft 30 of geared motor 10.

The chamber 21 is closed at that position, so that no provision is necessary in order to ensure hermetic sealing thereof.

The proximal connecting arm 4 comprises a pivot 41 pivotable in the blind hole 40. Along the support body-proximal connecting arm (geometric) articulation axis 6, two "physical" articulation semiaxes are therefore defined, comprising the pair output shaft/through hole 30, 31 and the pair blind hole/pivot 40, 41.

Figure 5:
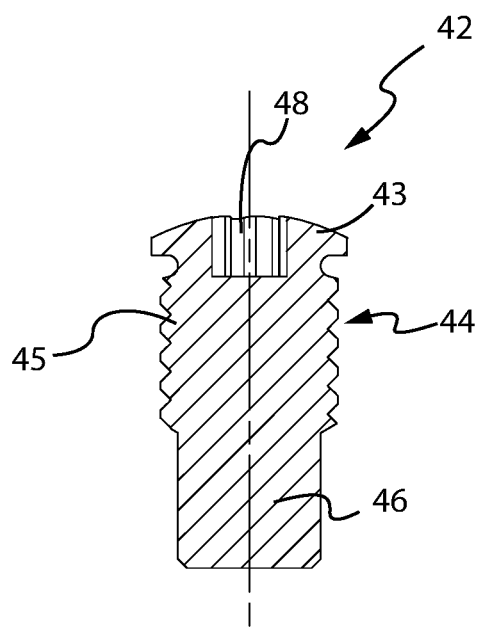
Figure 6:
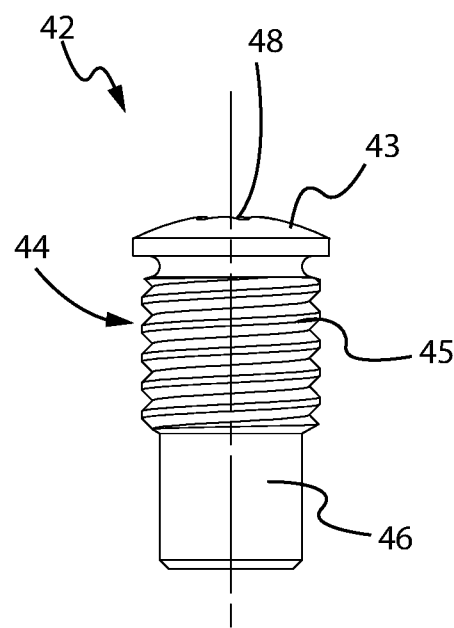

In the case shown and with reference also to FIGS. 5 and 6, the pivot 41 is formed in a member 42 comprising a screwing tool engagement head 43, and a shank 44 extended from the head 43. A portion 45 of the shank 44 contiguous to the head 43 is provided with an external threading, and the remaining portion 46 of the shank 44 is without threading. The portion 45 provided with external threading is screwed in an internally threaded through hole 47 of the proximal connecting arm 4; the portion 46 without threading, that protrudes from the through hole 47, forms said pivot 41.

The member 42 may be made of steel, for example of martensitic stainless steel, optionally solubilized and aged, in particular of martensitic stainless steel of class AISI 630 H1075 of the AISI, solubilized and aged at 1075° F.

The member 42 may be subject to a blackening surface treatment, for aesthetic purposes.

In the case shown, the head 43 is provided, merely by way of a non-limiting example, with an hexalobular recess 48 of the type present in the screws commercially known as Torx screws.

Figure 7:
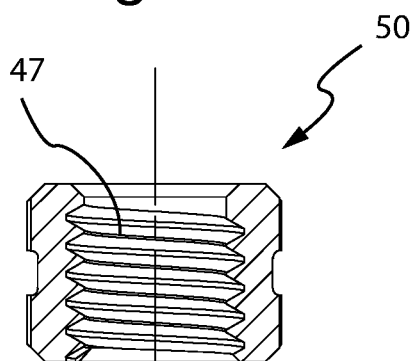
FIGS. 7 and 8 show an insert used in the derailleur of FIG. 1, in longitudinal section and in a lateral view.
Figure 8:
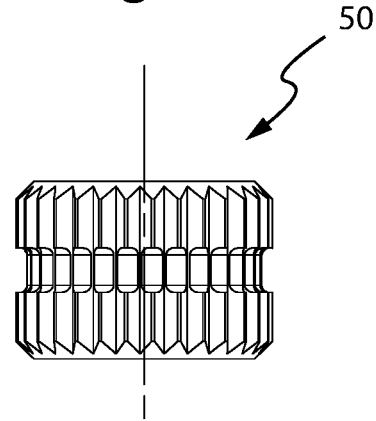

In the case shown and with reference also to FIGS. 7 and 8, the internally threaded through hole 47 may be made in an insert 50 of the proximal connecting arm 4.

The insert 50 may be co-moulded in the proximal connecting arm 4.

The insert may be made of steel, for example of austenitic stainless steel, in particular of austenitic stainless steel of class AISI 304 of the AISI.

Figure 9:
FIGS. 9 and 10 show a blind bushing used in the derailleur of FIG. 1, in longitudinal section and in a lateral view.
Figure 10:
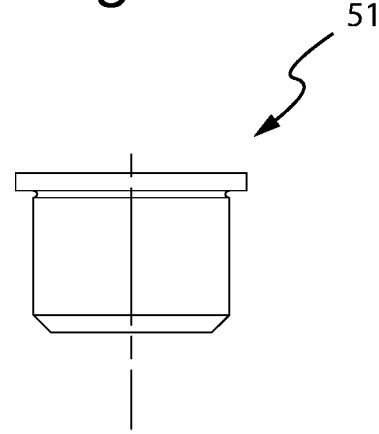

In the case shown and with reference also to FIGS. 9 and 10, the blind hole 40 of the case 20 may be provided with a blind bushing 51.

The blind bushing 51 may be overprinted in the first component.

The blind bushing 51 may be made of steel, for example of martensitic stainless steel, possibly solubilized and non-aged, in particular of martensitic stainless steel of class AISI 630 of the American Iron and Steel Institute (AISI), solubilized and non-aged.

The blind bushing 51 may be subject to a surface chemical treatment to reduce the sliding friction coefficient of the pair blind hole/pivot 40, 41, for example to a Nickel-Teflon surface chemical treatment.

Turning back to FIG. 4, in the case shown the chamber 21 also crosses the support body-distal connecting arm articulation axis 7, that is the second of the two articulation axes 6, 7 to which the support body 2 is articulated.

In the case shown, also along such support body-distal connecting arm (geometric) articulation axis 7, two "physical" articulation semiaxis are defined, comprising in this case two pairs blind hole/pivot.

In detail, in the case shown the case 20 comprises two blind holes 52, 53 coaxial along said axis and open outwards on opposed sides of the case 20, and the distal connecting arm 5 comprises pivots 54, 55 respectively pivotable in the blind holes 52, 53. The distal connecting arm 5 should be meant as being illustrative of the third component mentioned in the introductory part of the present description.

However, only one of the two "physical" semiaxes could be defined by a pair blind hole/pivot, namely only the blind hole 52 and the pivot 54 or only the blind hole 53 and the pivot 55 could be provided for.

As far as the embodiment of each of the two pairs blind hole/pivot 52, 54; 53, 55, or of the only one present, are concerned, reference is made to the previous description of the embodiment of the pair blind hole/pivot 40, 41.

It is noted that instead of each of the pairs blind hole/pivot 40, 41; 52, 54; 53, 55, the pivotal coupling between the support body 2 and the proximal connecting arm 4, respectively the distal connecting arm 5, may be made therein through other means, for example a through hole extended in a region of the case 20 not crossing the chamber 21 (for example in a suitably arranged appendage or bracket) in which a pivot of the proximal connecting arm 4, respectively of the distal connecting arm 5, is pivotable, or a pivot of the support body 2 pivotable in a hole of the proximal connecting arm 4, respectively of the distal connecting arm 5.

Although it has been described with reference to a geared motor 10 housed in the support body 2 having output shaft 30 at the support body-proximal connecting arm articulation axis 6, the invention applies to other derailleur configurations.

So, the geared motor 10 may be housed in the support body 2, but have the output shaft 30 at the support body-distal connecting arm articulation axis 7, using for example an opposed configuration of the pairs blind hole/pivot and drive shaft/through hole with respect to that shown, including all the variants and changes discussed above.

The geared motor 10 may also be housed in the chain guide 3 and have the output shaft 30 at the chain guide-proximal connecting arm articulation axis 8 or at the chain guide-distal connecting arm articulation axis 9; it may be housed in the proximal connecting arm 4 and have output shaft 30 at the chain guide-proximal connecting arm articulation axis 8 or at the support body-proximal connecting arm articulation axis 6; it may be housed in the distal connecting arm 5 and have the output shaft 30 at the support body-distal connecting arm articulation axis 7 or at the chain guide-distal connecting arm 9 articulation axis; the configurations of the pairs blind hole/pivot and drive motor/through hole to be used in each case being clear in the light of the present description.

As mentioned above, alternatively or additionally to the hermetically closed chamber 21 housing the geared motor 10 (besides any other electric/electronic devices), one or more of the other mutually movable components 2, 3, 4, 5 of the derailleur 1 may comprise a hermetically closed chamber housing other electric/electronic devices, among which for example the electric power supply unit 12 or the data processing system. In this case, one or more of the "physical" semiaxes corresponding to the two (geometric) articulation axes to which this component is articulated may be defined through pairs blind hole/pivot, the component thus having one to four blind holes. By providing for four pairs blind hole/pivot, if all the electric/electronic devices are housed in the chamber without the need for electric cables to pass, then the chamber is hermetically closed. In some cases, the chamber may still necessitate a through hole for electric cables to pass, but such a passage may be easily hermetically sealable through a suitable gasket.

When the component now described is considered as the first component under the terms used in the introductory part, for example when it is an alternative rather than an addition with respect to the provision, in a first component, of the hermetically closed chamber 21 housing the geared motor 10, then one of the blind holes represents the first blind hole under the terms used in the introductory part, and the second blind hole under the terms used in the introductory part, coaxial with the first blind hole, may be or not be present.

In any case, as far as the embodiment of each of the—one to four—pairs blind hole/pivot is concerned, reference is made to the previous description of the embodiment of the pair blind hole/pivot 40, 41, including all the variants and changes discussed above.

As far as the embodiment of possible "physical" axes not defined by a respective pair blind hole/pivot is concerned, the above mentioned considerations apply.

Last it is noted that the geared motor 10 may also be arranged with its output shaft 30 extended along the diagonal of the articulated parallelogram, in its own case: in that case all four mutually movable components 2, 3, 4, 5 are available to house electric/electronic devices and may provide for up to four pairs blind hole/pivot.

Summing up and generally stated, what has been described for the first component, whether it contains the geared motor 10 or not, may be made also in one or more other components, so as to have plural hermetically closed chambers at disposal, with the structural restriction that each of the articulation axes is shared by two components. In practice, each of the second and third components—under the terms of the introductory part—may have whatever conformation along the articulation axis that it shares with the fourth component, but along the other articulation axes it should first of all feature the member matching that featured by the "first component".

Those skilled in the art will understand that the derailleur 1 may comprise other members and devices, among which for example the above mentioned "(gearshift) release device".

Those skilled in the art will understand that the derailleur 1 may also have a shape even considerably different from that shown, and/or additional components not shown for the sake of simplicity.

The secondary cells of the electric power supply unit may be recharged while the electric power supply unit is on board of the bicycle, by providing for suitable recharge connectors, and/or the electric power supply unit may be recharged in a recharge cradle after having been detached from the derailleur.

The various embodiments, variants and/or possibilities of each component or group of components that have been described are to be meant as combinable with each other in any manner, unless they are mutually incompatible.

The above is a description of various embodiments of inventive aspects, and further changes can be made without departing from the scope of the present invention. The shape and/or size and/or location and/or orientation of the various components and/or the succession of the various steps can be changed. The functions of an element or module can be carried out by two or more components or modules, and vice-versa. Components shown directly connected to or contacting each other can have intermediate structures arranged in between them. Steps shown directly following each other can have intermediate steps carried out between them. The details shown in a figure and/or described with reference to a figure or to an embodiment can apply in other figures or embodiments. Not all of the details shown in a figure or described in a same context must necessarily be present in a same embodiment. Features or aspects that turn out to be innovative with respect to the prior art, alone or in combination with other features, should be deemed to be described per se, irrespective of what is explicitly described as innovative.

What is claimed is:

1. A bicycle electric/electronic derailleur comprising:
    a plurality of mutually movable components, comprising a support body configured to be attached to a bicycle frame, a chain guide, and a pair of connecting arms comprising a proximal connecting arm and a distal connecting arm, for connection between the support body and the chain guide at respective geometric articulation axes, comprising a support body-proximal connecting arm articulation axis, a support body-distal connecting arm articulation axis, a chain guide-proximal connecting arm articulation axis, and a chain guide-distal connecting arm articulation axis,
    a geared motor for controlling mutual motion of the plurality of mutually movable components,
    wherein at least one first component of the mutually movable components comprises a case,
    wherein a chamber containing said geared motor and/or one or more electric/electronic devices is formed in said case, the chamber crossing at least one first axis of the two among said articulation axes to which the first component is articulated, wherein said case comprises a first blind hole coaxial with said crossed first axis and open outwards of said case, and a second component of the mutually movable components articulated to the first component at said crossed first axis comprises a pivot pivotable in the first blind hole.

2. The bicycle electric/electronic derailleur according to claim 1, wherein the first blind hole of the case is provided with a blind bushing.

3. The bicycle electric/electronic derailleur according to claim 2, wherein the blind bushing is overprinted in the first component.

4. The bicycle electric/electronic derailleur according to claim 1, wherein the pivot is formed in a member comprising a screwing tool engagement head and a shank extending from the head, a portion of the shank contiguous to the head being provided with an external threading and the remaining portion of the shank being without threading, wherein the portion provided with external threading is screwed into an internally threaded through hole of the second component, the portion without threading protruding from the through hole forming said pivot.

5. The bicycle electric/electronic derailleur according to claim 4, wherein the internally threaded through hole is made in an insert of the second component.

6. The bicycle electric/electronic derailleur according to claim 5, wherein the insert is co-moulded in the second component.

7. The bicycle electric/electronic derailleur according to claim 1, wherein the case comprises a second blind hole coaxial with said first crossed axis and open outwards on one side of said case opposed with respect to the first blind hole, the second component comprising a second pivot pivotable in the second blind hole.

8. The bicycle electric/electronic derailleur according to claim 1, wherein the chamber contains said geared motor and possibly said one or more electric/electronic devices, wherein said case further comprises a through hole coaxial with said first crossed axis, the through hole being on the opposite side of said case with respect to the first blind hole, an output shaft of the geared motor extending through the through hole and through a hole of the second component, a hermetic seal gasket being provided for between the through hole and the output shaft.

9. The bicycle electric/electronic derailleur according to claim 1, wherein the chamber crosses both articulation axes to which the first component is articulated, wherein said case comprises one or two additional blind holes, coaxial with the second crossed axis, a third component of the mutually movable components articulated to the first component at said second crossed axis comprising one or respectively two pivots pivotable in said one or two additional blind holes.

10. The bicycle electric/electronic derailleur according to claim 1, wherein said one or more electric/electronic devices comprises an electric power supply unit, preferably of the secondary cell battery type, and/or one or more components controlling the geared motor and/or the electric power supply unit, if provided for.

11. The bicycle electric/electronic derailleur according to claim 1, wherein the first component is the support body.

12. The bicycle electric/electronic derailleur according to claim 1, wherein the derailleur is a rear derailleur.

* * * * *